United States Patent
Sarkar et al.

(10) Patent No.: US 12,326,897 B2
(45) Date of Patent: Jun. 10, 2025

(54) IDENTIFICATION OF AN UNKNOWN AUTHOR OF A CREATIVE WORK

(71) Applicant: International Business Machines Corporation, Armonk, NY (US)

(72) Inventors: Sanmitra Sarkar, Kolkata (IN); Mukundan Sundararajan, Bangalore (IN); Sumitro Ghatak, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 18/227,459

(22) Filed: Jul. 28, 2023

(65) Prior Publication Data
US 2025/0036677 A1 Jan. 30, 2025

(51) Int. Cl.
*G06F 16/40* (2019.01)
*G06F 16/45* (2019.01)

(52) U.S. Cl.
CPC ................... *G06F 16/45* (2019.01)

(58) Field of Classification Search
CPC ...................................... G06F 16/45
See application file for complete search history.

(56) References Cited

U.S. PATENT DOCUMENTS

| 8,634,947 | B1* | 1/2014 | Kleinpeter | G06F 16/683 700/94 |
|---|---|---|---|---|
| 2017/0357724 | A1* | 12/2017 | Narayanam | G06Q 50/01 |
| 2019/0205467 | A1* | 7/2019 | Wold | G06F 16/683 |

FOREIGN PATENT DOCUMENTS

| CN | 109657527 A | 4/2019 |
|---|---|---|
| CN | 111930947 A | 11/2020 |
| CN | 113421589 A | 9/2021 |
| IN | 201741020226 A | 6/2017 |

OTHER PUBLICATIONS

Shirali-Shahreza et al., Fast and Scalable System for Automatic Artist Identification, IEEE Transactions on Consumer Electronics, vol. 55, No. 3, 2009 [retrieved Apr. 30, 2024]. Retrieved from the Internet: https://ieeexplore.ieee.org/document/5278049 (Year: 2009).*
Roell, 3 Tricks to Figure out the Author's Tone, May 24, 2019, https://www.thoughtco.com/tricks-to-figure-out-the-authors-tone-3211742.

* cited by examiner

*Primary Examiner* — Kristopher Andersen
(74) *Attorney, Agent, or Firm* — Garg Law Firm, PLLC; Rakesh Garg; Gavin Giraud

(57) ABSTRACT

An embodiment establishes a creative work database based in part on data representative of a plurality of identified creative works and authors associated with the plurality of identified creative works. The embodiment extracts a set of a first set of features from an unidentified creative work. The embodiment compares the first set of features corresponding to the unidentified creative work to a second set of features corresponding to an identified creative work to obtain a similarity score between the unidentified creative work and the identified creative work. The embodiment compares the similarity score to a threshold similarity score, and upon a determination that the similarity score meets the threshold similarity score, identifies a particular author to associate with the unidentified creative work. The embodiment authenticates the new identified creative work. The embodiment updates the creative work database to include the new identified creative work.

20 Claims, 8 Drawing Sheets

IDENTIFICATION OF AN UNKNOWN AUTHOR OF A CREATIVE WORK

BACKGROUND

The present invention relates generally to multimedia feature extraction and attribute recognition. More particularly, the present invention relates to a method, system, and computer program for identification of an unknown author of a creative work.

Artificial intelligence (AI) technology has evolved significantly over the past few years. Modern AI systems are achieving human level performance on cognitive tasks like converting speech to text, recognizing objects and images, or translating between different languages. This evolution holds promise for new and improved applications in many industries.

Natural language processing (NLP) refers to a field of AI concerned with enabling computers to understand text and spoken words in much the same way that a human being can. NLP technology involves interactions between computers and human language, including the development of computer programs to process and analyze large amounts of natural language data. Further, applications of NLP technology involve the development of computer systems capable of understanding the contents of documents, including the contextual nuances of the language within documents. NLP technology can be utilized to accurately extract information and insights contained in documents as well as categorize and organize the documents themselves. Applications of NLP include, but are not limited to, speech recognition, natural-language understanding, and natural-language generation.

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

SUMMARY

The illustrative embodiments provide for identification of an unknown author of a creative work. An embodiment includes establishing a creative work database based in part on data representative of a plurality of identified creative works and authors associated with the plurality of identified creative works. The embodiment also includes extracting a first set of features from an unidentified creative work. The embodiment also includes comparing the first set of features corresponding to the unidentified creative work to a second set of features corresponding to an identified creative work to obtain a similarity score between the unidentified creative work and the identified creative work. The embodiment also includes comparing the similarity score to a threshold similarity score. The embodiment also includes, upon a determination that the similarity score meets the threshold similarity score, identifying a particular author to associate with the unidentified creative work and classifying the unidentified creative work as a new identified creative work. The embodiment also includes authenticating the new identified creative work. The embodiment also includes updating the creative work database to include the newly identified creative work. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
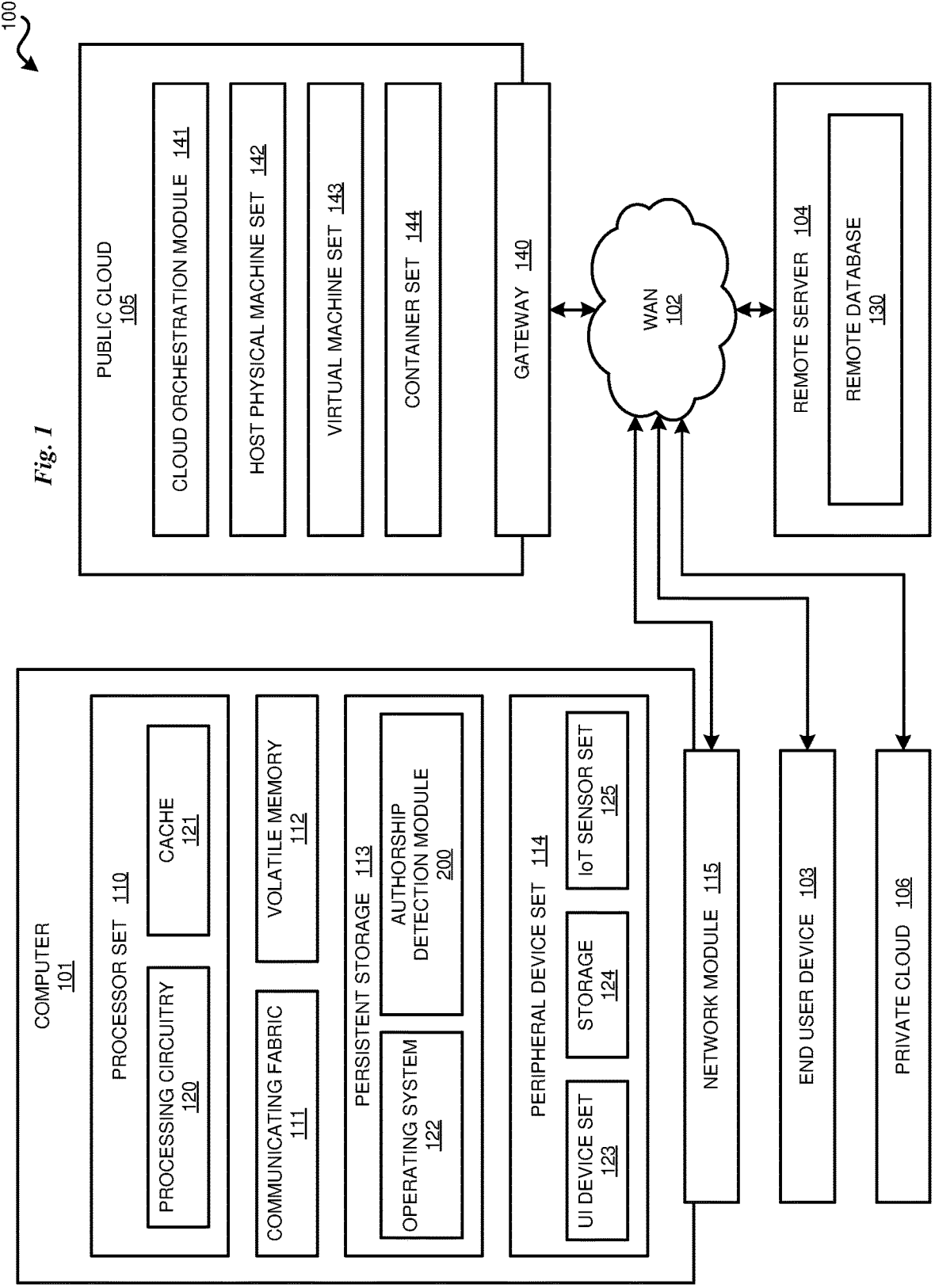
FIG. 1 depicts a block diagram of a computing environment in accordance with illustrative embodiments.

There are many creative works in existence today whose authors are unknown. These creative works may range from ancient times to the present day. Accordingly, there currently exist many creative works available in the public domain today for which the author is not known. In some instances, the author might have been known at some point in time, but the information relating to the authorship of a creative work has since been lost. In some instances, information relating to the authorship of a particular creative work has been lost or not captured during the paradigmatic technological shift from analog to digital technologies. During such periods of technological shift, such as the period of digitalization where analog mediums were transformed into digital mediums, the identity of the many authors of original creative works were lost during the process of transferring creative works from one medium to another.

For example, in the late 19$^{th}$ century, recordings of creative works were often stored on wax phonogram cylinders. Following phonogram cylinders, recordings were often stored on vinyl records. Following vinyl records, recordings were often stored on magnetic tape cassettes. Following magnetic tape cassettes, recordings were often stored on optical discs, which are likewise becoming obsolete in the present. Accordingly, during each technological shift accompanying each technological era, information, such as authorship information, has been lost during the transition from one physical medium to another physical medium. Today, many creative works are nonetheless stored across a variety of online, offline, and/or obsolete recording mediums.

There are a variety of reasons why identifying the authorship of a creative work may be important. For example, identifying the authorship information of a creative work whose author is unknown enables the discovery of lost creative works of known authors. Further, discovering the authorship of a creative work may enable gaining insight into the particular creative work, as well as for gaining insight of the author of a particular creative work.

Subject matter experts (SMEs) are often employed to identify a particular creative work with a particular author. However, SMEs often disagree with each other when it comes to identifying authorship of original works. Further, SMEs may rely on subjective judgments to identify authorship. There is currently no objective technique for determining the similarity between two or more creative works in order to identify an author based on the similarity between an unidentified creative work and a creative work whose author is known.

Currently there is no way to objectively identify the author of a creative work whose author is unknown. As a result, current efforts in this regard are inefficient and ineffective due to the current inability to identify the author of a creative work without introducing human bias. Accordingly, there is a need to identify authors of creative works whose authorship information has been lost or is otherwise unavailable. Further, there is a need to be able to objectively identify authorship, without reliance on an SME.

The present disclosure addresses the deficiencies described above by providing a process (as well as a system, method, machine-readable medium, etc.) that develops a system that considers feature extraction, feature representation, and/or NLP related techniques to identify the authorship information of a creative work. The illustrative embodiments provide for identification of unknown author of a creative work.

Illustrative embodiments include extracting features from an identified creative work whose author is known to construct a feature vector representing the identified creative work. Illustrative embodiments further include extracting features from an unidentified creative work whose author is unknown to construct a feature vector representing the unidentified creative work. Illustrative embodiments further include comparing of the feature vector corresponding to the unidentified creative work to the feature vector of the identified creative work to a determine a similarity between the unidentified creative work and the identified creative work. Illustrative embodiments further include identifying an author whose creative work is most similar to the unidentified creative work, and associating the unidentified creative work with the author that has been identified.

Illustrative embodiments include constructing a feature vector for a creative work based on a variety of features extracted from the creative work. The features for the creative work may include, but are not limited to, audio-related features, text related features, visual-related features, style related features, sophistication related features, authorship signature related features, as well as other features that may correspond to a creative work. Illustrative embodiments include extracting features from an audio-based creative work. Illustrative embodiments further include extracting features from visual-based creative work. Illustrative embodiments further include extracting features from a text-based creative work. Illustrative embodiments further include extracting emotion-related and/or sentiment related features from a text representation corresponding to the audio data of a creative work.

Illustrative embodiments provide for one or more machine learning models trained to extract features from a creative work, compare features that are shared between creative works, and/or associate a creative work with an author. Further, a machine learning model may be trained to inference the author of a creative work that is not yet associated with any author. Illustrative embodiments include training a machine learning model to classify a creative work by style. Further, illustrative embodiments include training a machine learning model to classify a creative work by sophistication. Further, illustrative embodiments include training a machine learning model to classify a creative work by authorship signature. In an embodiment, each model may be trained on a dataset of labeled creative works.

As used throughout the present disclosure, the term "machine learning model" or "ML model" refers to a computer program configured to find patterns, makes decisions, classify data and/or generate new data based on a previously unseen dataset. As a nonlimiting example, in the context NLP, an ML model may be configured to parse and correctly recognize intent behind previously unheard sentences or combinations of words. As another nonlimiting example, in the context of image recognition, an ML model can be configured to recognize objects in image data. An ML model may perform such tasks by having the model trained with a particular dataset, referred to as a training dataset. The training dataset may include labeled data and/or unlabeled data. Labeled data refers to a dataset of data samples that have been labeled with a particular attribute. As a nonlimiting example, labeled data of images may include images wherein each image has labeled as a cat, dog, bird, fish, etc. Unlabeled data refers to a dataset of data samples that have not been labeled with any particular attribute. To continue on the previous nonlimiting example, unlabeled data of images may contain objects, however the types of objects within the data samples are not known. During training of an ML model, one or more machine learning algorithms may be optimized to find certain patterns or outputs from the training dataset, depending on the desired task being performed. Further, the ML model may include or one or neural networks, including but not limited to, a neural network, a deep neural network (DNN), a convolution neural network (CNN), a recurrent neural network (RNN), a generative adversarial network (GAN), a transformer network, as well as other neural networks architectures, and/or any combination thereof. The output of the training process results in a computer program with specific rules and data structures, e.g., an ML model that is configured to perform one or more tasks that the model was trained to perform. In some embodiments, one or more ML models may be trained to perform certain tasks described herein.

Further, the training dataset may be pre-processed and/or structured to improve training the machine learning model and ultimately provide a more effective resultant machine learning model. Pre-processing data techniques may include, but are not limited to, use of the following heuristics: linear data transformation: transform the data to make the relationship linear (e.g., log transform for an exponential relationship); noise reduction: use data cleaning operations that better expose and clarify the signal in the data, e.g., remove outliers in the output variable (y) where possible; Collinearity reduction: calculate pairwise correlations for the input data and remove the most correlated to prevent over-fitting of the data due to highly correlated input variables; Gaussian distribution: transform the input data (e.g., logarithmic or Box-Cox transformation) so that input and output variables have a Gaussian distribution; and Rescale Inputs: scale data using normalization (e.g., rescale data so that values are within a range of 0 and 1) or standardization (e.g., rescale data so that the mean of observed values is 0 and the standard deviation is 1).

As used throughout the present disclosure, the term "creative work" refers to any physical manifestation of creative activity stored in a physical medium. A creative work may include, but is not limited to, an audio-based creative work, a text-based creative work, and/or a visual-based creative work. Examples of an audio-based creative work may include, but are not limited to, songs, compositions, hymns, speeches, instrumentation, and/or any other type of creative work in the form of an audio recording. Examples of a text-based creative work may include, but are not limited to, a piece of writing, literature, song lyrics, a poem, a written speech, an essay, a handwritten work, or any other creative work that includes words. Examples of a visual-based creative work may include, but are not limited to, paintings, drawings, photographs, film, videos, and/or any other creative work that includes visual elements. A creative work may also include a multimedia creative work, including any creative work that includes any combination of audio, visual, and/or textual elements. As used throughout the present disclosure, the term "author" refers to a creator and/or originator of a creative work.

As used throughout the present disclosure, the term "identified creative work" refers to a creative work that is associated with an author. Accordingly, an identified creative work is a creative work for which the author is known. On the other hand, the term "unidentified creative work" refers to a creative work that is not associated with an author. Accordingly, an unidentified creative work is a creative work for which the author is not known.

As used throughout the present disclosure, a "feature" refers to a characteristic, property, and/or or property of a creative work. Examples of a feature of a creative work may include, but are not limited to, text-related features (e.g., words in prose, lyric words, etc.), audio-related features (e.g., notes, swaras, temporal flow, sequence, note duration, etc.), style-related features, sophistication related features, and/or signature-related features (e.g., word/phrase/sentence count preceding a signature, word/phrase/sentence count succeeding a signature, word/phrase/sentence context, linkages of contexts, a set of signatures, theme, etc.)

As used throughout the present disclosure, the term "style" refers to a pattern of features within a creative work that enables a set of features to be categorized in a particular category. As used throughout the present disclosure, the term "sophistication" refers to the level of complexity, intricacy, and/or richness of a pattern of features. Further, sophistication may refer to the existence of a pattern within a style-related pattern exhibited in a creative work. Accordingly, the style-related pattern may be defined as a first layer of a creative work, while the sophistication-related pattern may be defined as a second layer of the creative work. As a nonlimiting example, if the creative work is a song, then the style of music may be classical music, which may be characterized by specific musical features associated with classical. To continue on the previous nonlimiting example, if the creative work is a song belonging to the style (genre) of classical music, then a sophistication may include compositional intricacies which fall under the domain of classical music, which may distinguish the song from other songs within the domain of classical music. Further, the style and sophistication of a creative work enables determining whether a particular creative work exhibits some level of similarity to other creative works within a particular domain. Further, restricting feature comparison to a particular domain may include a narrower domain that enables a faster identification of an author of a creative work. It is contemplated that both style and sophistication features may help to narrow down the authorship, and the layering of patterns enables further narrowing to a set potential known authors associated with a particular style and/or sophistication. Further, style-related features and/or sophistication-related features may also be utilized by a new and/or existing author to analyze the author's work in light of other creative works to find similarities to other existing creative works. It is further contemplated that feature comparison may be utilized to establish authenticity of a creative work, and least in part via a comparison of the creative work to other creative works exhibiting a similar style and/or sophistication.

As used throughout the present disclosure, the term "authorship signature" refers to a unique identifier or uniquely identifying characteristic associated with a particular author. While a feature refers to a single characteristic/attribute of a creative work, a signature refers to a combination of features that provides a unique identifier a creative work as belonging to a particular author. Although it may be the case that the creative work of multiple authors may contain similar or even some of the same features, it is contemplated that it is highly unlikely that the creative works of multiple different authors will contain the same authorship signature. The lower-level authorship signatures may be linked in the time or spatial domains to create a single layer, and multiple layers may be established across a creative work. Within a layered pattern, the complexity of the units, brevity of units, and/or uniqueness of units enables the detection of a sophistication. A sophistication may be associated with a particular author or authors, which may further enable identification of an author a particular creative work.

Illustrative embodiments include constructing a first feature vector based on an input unidentified creative work, and a second feature vector based on an input identified creative work. Embodiments further include determining the similarity between the first feature vector and the second feature vector. In an embodiment, determining similarity between the first feature vector and the second feature vector includes calculating a cosine similarity between the first feature vector and the second feature vector. The embodiment further includes determining whether the similarity between the unidentified creative work and the identified creative work meets a predetermined similarity threshold. In an embodiment, the similarity threshold is defined as a cosine similarity value greater than or equal to 0.70. Further, the cosine similarity between two vectors may be measured as an angle, where an angle of 0 degrees means two vectors overlap (proving they are similar) while an angle of 90 degrees means two vectors are dissimilar. In an embodiment, the threshold similarity is defined as an angle less than 45 degrees. It is contemplated that the threshold similarity score may be defined as any value and/or angle. Further, embodiments include constructing a rank ordering of a plurality identified creative works based on the similarity of each identified creative work to the unidentified creative work. The embodiments further include identifying the author of the highest ranked identified creative work as the author of the unidentified creative work.

Illustrative embodiments include a process for evaluating the likelihood that an unidentified creative work and one or more identified creative works belong to the same author. In some such embodiments, the process includes calculating a probability score between the unidentified creative work and each identified creative work, wherein the probability score represents the likelihood that that an unidentified creative work and one or more identified creative works belong to the same author. Further, in some such embodiments, the process may include assigning a probability score to each identified creative work compared against the unidentified creative work, and selecting the identified creative work assigned with the highest probability score as the identified creative work that most likely belongs to the same author as the unidentified creative work.

Illustrative embodiments include a process that includes calculating a probability score based in part on a similarity score between an unidentified creative work and one or more identified creative works. In some such embodiments, the process includes calculating a similarity score between the unidentified creative work and each of the one or more identified creative works. Further, the process includes transforming the similarity score between the unidentified creative work and each identified creative work into a probability score, wherein the probability score represents the likelihood that the unidentified creative work and an identified creative work belong to the same author. In some such embodiments, the process may include applying a transformation function to the similarity score to convert the similarity score into a probability score. Examples of a transformation function that may be utilized may include, but are not limited to, a linear transformation function, a sigmoid transformation function, an exponential transformation function, and/or any other suitable transformation function to convert the similarity score to a probability score. Further, some such embodiments include constructing a rank ordering of a plurality identified creative works based on the probability score of each identified creative work The embodiments further include identifying the author of the highest ranked identified creative work as the author of the unidentified creative work.

Illustrative embodiments further include a process that includes utilizing a subject matter expert (SME) validation score in conjunction with a probability score to identify the author of an unidentified creative work. In some embodiments, the process includes calculating an SME validation score to be used in conjunction with the probability score for determining the likelihood that an unidentified creative work and an identified creative work belong to the same author. It is contemplated that situations may exist where it may be useful to include an SME validation score in conjunction with the probability scores corresponding to each of the identified creative works. Examples of a situation where the process may incorporate an SME validation may include, but are not limited to, a situation where two or more probability scores are sufficiently high, a situation where two or more probability scores are very close in value to each other, a situation where no probability scores are sufficiently high, as well as other situations. In some embodiments, the SME validation score is incorporated irrespective of a particular situation.

Illustrative embodiments include establishing a creative work database based at least in part on data corresponding to a plurality of creative works. The data corresponding to the plurality of creative works may include, but is not limited to, audio data, text data, image data, and/or any combination thereof. Further, the data corresponding to the plurality of creative works may be representative of a plurality of identified creative works and one or more authors associated with one or more identified creative works. In some embodiments, the creative work database is in the form of a distributed database. In some embodiments, the creative work database is in the form of a blockchain database.

Illustrative embodiments include training one or more feature extraction models to extract one or more features from a creative work. In some such embodiments, the feature extraction model may include a plurality of ML models trained to perform various tasks to enable the feature extraction model to extract features from a creative work. Further, in some such embodiments, the feature extraction model may include an audio-signal analyzer module trained to extract audio-related features from a creative work. Further, in some such embodiments, the feature extraction model may include a text-analysis model trained to extract text-related features from a creative work. Further, in some such embodiments, the feature extraction model may include an emotion analyzer model trained to extract emotion-related and/or sentiment related features from a creative work. Further, in some such embodiments, the feature extraction model may include a style analyzer model trained to extract style-related features from a creative work. Further, in some such embodiments, the feature extraction model may include a sophistication analyzer model trained to extract sophistication-related features from a creative work. Further, in some such embodiments, the feature extraction model may include speech-to-text model trained to convert audio data related to a creative work to text data. In some such embodiments, the speech-to-text model may include an acoustic model and a language model that may be combined to convert audio data to text data. Further, in some such embodiments, text-related features may be extracted from text data converted from audio data. In some such embodiments, the feature extraction model may further include text-to-speech model trained to convert text data related to a creative work to audio data. In some such embodiments, audio-related features may be extracted from audio data that was converted from text data.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an authorship detection module 200 that identifies an author of an unidentified creative work and associates that creative work with the author that was identified. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible.

Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2A:
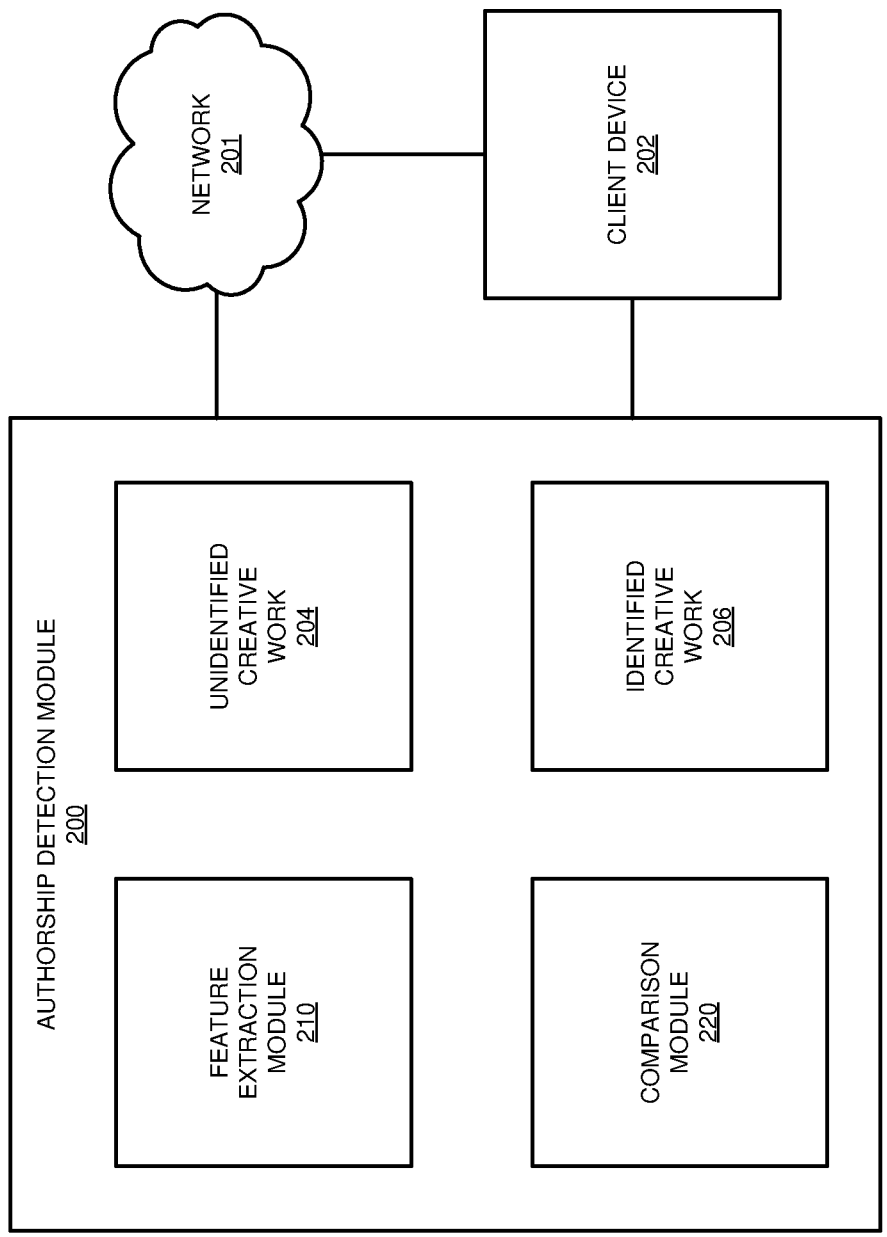
FIG. 2A depicts a block diagram of a computing environment including an example authorship detection module in accordance with illustrative embodiments.

With reference to FIG. 2A, this figure depicts a block diagram of a computing environment including an example authorship detection module 200 in accordance with illustrative embodiments. The authorship detection module 200 may receive data corresponding to one or more creative works from the network 201 and/or client device 202. It is contemplated that data may include, but is not limited to, audio data, visual data, and/or text data. Further, authorship detection module 200 is configured to identify an author of an unidentified creative work, meaning that the authorship detection module 200 may identify the author of a creative work for which an author is not known, as described in greater detail herein. In some embodiments, client device 202 connects to authorship detection module 200 with an API gateway via a network 201 or combination of any suitable networks such as the Internet, etc. and uses any suitable communication protocols such as Wi-Fi, Bluetooth, etc. As a non-limiting example, in an embodiment, client device 202 executes a routine to initiate interaction with the authorship detection module 200. For instance, in some embodiments, the client device 202 executes a routine to instruct the authorship detection module 200 to identify an author of an unidentified creative work.

Authorship detection module 200 as shown includes a feature extraction module 210 and a comparison module 220. The feature extraction module 210 is configured to extract features from a creative work, such as unidentified creative work 204 and identified creative work 206 received from the network 201 and/or client device 202, as described herein. Further, comparison module 220 is configured to compare a first set of features corresponding to an unidentified creative work 204 to a second set of features corresponding to an identified creative work 206, to determine a similarity score between the unidentified creative work 204 and the identified creative work 206, as well as to compare the similarity score to a predetermined threshold similarity score. Upon a determination that the similarity score between the unidentified creative 204 work and the identified creative work 206 meets the threshold similarity score, the authorship detection module 200 identifies the author associated with the identified creative work as the author of the unidentified creative work.

In the illustrative embodiment, although only one identified creative work 206 is shown, it is contemplated that comparison module 220 may compare any number of identified creative works to the unidentified creative work 204. In an embodiment, the comparison module 220 compares the unidentified creative work to a plurality of identified creative works, and constructs a rank ordering of identified creative works based on the similarity between each identified creative and the unidentified creative work 204. Further, the authorship detection module 200 may identify the author of the highest ranked (e.g., most similar) creative work as the author of the unidentified creative work. Further, comparison module 220 may be configured to determine a probability score based on the similarity score between unidentified creative work 204 and each of a plurality of identified creative works, as described in greater detail herein. Further, in an embodiment, the comparison module 220 may construct a rank ordering of identified creative works based on the probability score assigned to each identified creative work, and authorship detection module 200 may identify the author of the highest ranked creative work as the author of the unidentified creative work, wherein the highest ranked creative work corresponds to a creative work that most likely belongs to the same author as the unidentified creative work.

In an embodiment, authorship identification module 210 may be configured to identify the author of an unidentified creative work by utilizing a subject matter expert (SME) validation score in conjunction with a probability score. An SME validation score refers to an additional term used to identify the author of an unidentified creative work, where the SME validation score may include any value assigned to the judgment of one or more SMEs regarding the authorship of a particular creative work. In some such embodiments, authorship detection module 210 calculates an SME validation score to be used in conjunction with the probability score for determining the likelihood that an unidentified creative work and an identified creative work belong to the same author. It is contemplated that situations may exist where two or more probability scores are very close in value to each other. In such situations, it may be useful to include an SME validation score to be used in conjunction with the probability scores corresponding to each identified creative work. As a nonlimiting example, it may be the case that a first probability score corresponding to a first identified creative work may be 0.91, while a second probability score corresponding to a second identified creative work may be 0.92. In such a scenario, due to the similarity between the first probability score and the second probability score, an SME validation score may be assigned to each unidentified creative work, and the SME validation score may be used in part to determine the likelihood that the unidentified creative work and each identified creative work belong to the same author. In some such embodiments, determining whether to incorporate an SME validation score to be used in conjunction with a probability score may include determining whether the similarity between two or more probability scores meet a probability-similarity threshold. In an embodiment, the probability-similarity threshold is 5% or 0.05. To continue on the previous example, since the first probability score (0.91) is within approximately 1.1% (~0.0109) of the second probability score (0.92), the example probability-similarity threshold is met, and a SME validation score may be incorporated in determining which identified creative work belongs to the same author as the unidentified creative work.

In some embodiments, an SME validation score is utilized in situations where two or more probability scores are sufficiently high. For example, if a first probability score corresponding to a first identified creative work is 0.90, while a second probability score corresponding to a second identified creative work is 0.97, a SME validation score may be incorporated into a calculation of the likelihood of the authorship of the unidentified creative work, even if the first and second probability scores are not within a probability-similarity threshold of each other. In some embodiments, an SME validation score may be utilized in situations where there exist no creative works with a sufficiently high probability score. For example, if the probability score of each identified creative work does not meet a predetermined probability score threshold, then an SME validation score may be incorporated into a determination of the likelihood of the authorship of the unidentified creative work. In some embodiments, the probability score threshold is 0.7. It is contemplated that the probability threshold may be set to any value. It is further contemplated that additional situation-specific instances may exist where the SME validation score may be utilized. In some embodiments, the SME validation score is utilized irrespective of a particular situation.

In some such embodiments where an SME validation score is utilized, the SME validation score may be based in part on input from one or more SMEs. For example, if an SME determines that the first identified creative work and the unidentified creative work belong to the same author, then the probability score of the first identified creative work may be weighed in favor of a determination that the first identified creative work and the unidentified creative work belong to the same author. As another nonlimiting example contemplated herein, suppose 2 out of 3 SMEs agree that the first identified creative work and the unidentified creative work belong to the same author. In such a scenario, the first and second probability scores may weighed based on a partial agreement in favor of a determination that the first identified creative work and the unidentified creative work belong to the same author. It is contemplated that the closer to a unanimous agreement between SMEs may result in a greater effect that the SME validation score may have on the probability score. For example, if a total of 2 SMEs disagree with each other regarding which identified creative work belongs to the same author as the unidentified creative work, then the weight of the SME validation score might have no effect on a final determination of the likelihood that an unidentified creative work and a particular identified creative work belong to the same author. It is contemplated that the weight of the SME validation score may be set to any value. It is further contemplated that the greater the weight of the SME validation score, the greater the influence the SME validation score may have on the ultimate determination of which creative work has the highest likelihood of belonging to the same author as the unidentified creative work.

In an embodiment, feature extraction module 210 is configured to extract audio related features from an audio-based creative work. In an embodiment, feature extraction module 210 is configured to extract text related features from a text-based creative work. In an embodiment, feature extraction module 210 is configured to extract visual related features from a visual-based creative work. In another embodiment, feature extraction module 210 is configured to extract a combination of audio-based features, text-based features, and/or visual based features from a multimedia creative work.

Figure 2B:
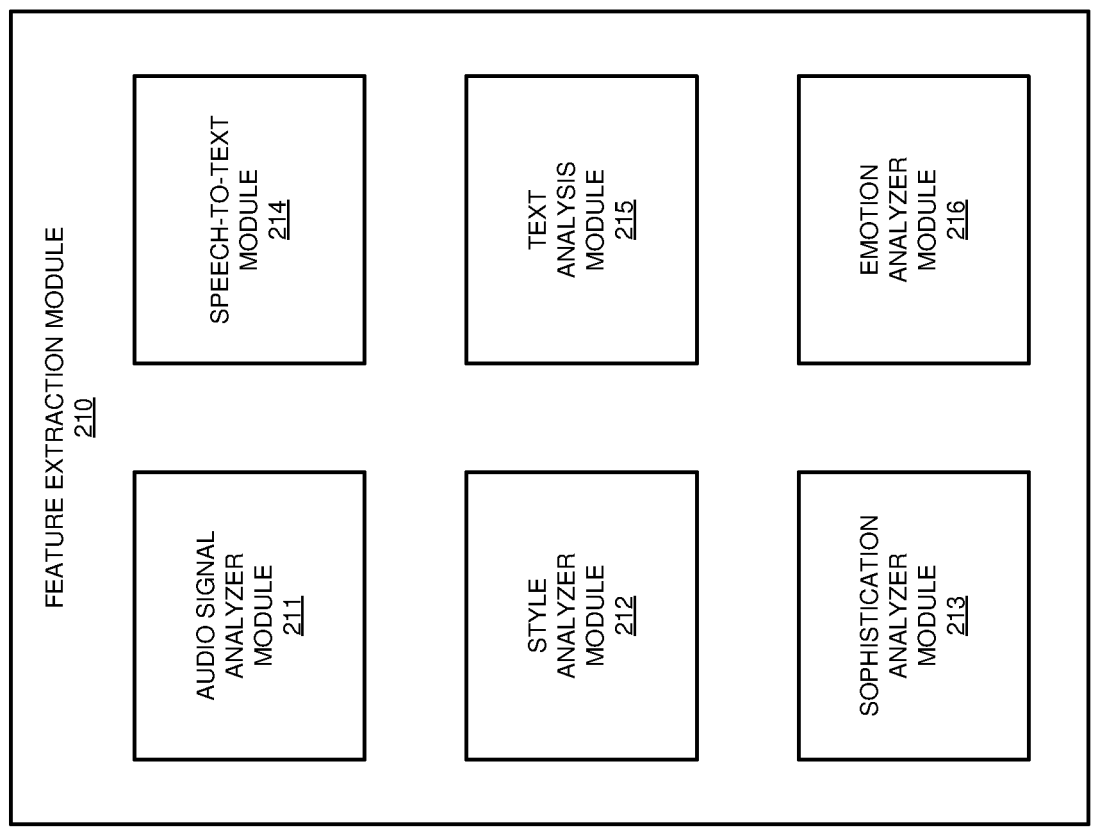
FIG. 2B depicts a block diagram of an example feature extraction module in accordance with illustrative embodiments.

With reference to FIG. 2B, this figure depicts a block diagram of an example feature extraction module 210. In the illustrated embodiment, the feature extraction module 210 includes the feature extraction module 210 of FIG. 2A.

With continued reference to FIG. 2B, the feature extraction module 210 is shown including a plurality of modules, including audio signal analyzer module 211, style analyzer module 212, sophistication analyzer 213, speech-to-text module 214, text analysis module 215, and emotion analyzer module 216. Further, feature extraction module 210 is configured to extract features from an input creative work, including an identified creative work, and/or an unidentified creative work. It is contemplated that some or all of the operations performed by the modules as herein described may be performed by some or all of some other modules depicted or modules not specifically shown, and that the specific depicted arrangement of modules is not a limiting aspect of the present disclosure.

Audio signal analyzer module 211 is configured to extract audio related features from an input creative work. In an embodiment, audio signal analyzer 211 receives a creative work in the form of an audio signal and extracts features from the audio signal corresponding to the creative work. In an embodiment, text analysis module 215 includes an ML model trained to extract features from audio data. In an embodiment, the audio signal analyzer module 211 may pre-process the audio signal corresponding to the audio-related creative work using various techniques, including but not limited to, noise reduction, filtering, and/or normalization. In an embodiment, audio signal analyzer module 211 extracts audio signal features from a creative work that may include, but are not limited to, amplitude, energy (e.g., magnitude), duration, tempo and beat-related features, spectral features, time-domain features, frequency-domain features, zero-crossing rate, Mel-frequency cepstral coefficients (MFCCs), chroma features, Root Mean Square (RMS) energy, as well as any other features related to audio data. Further, it is contemplated that different combinations of features may be used to capture different aspects of audio data. Further, in an embodiment, audio signal analyzer 211 extracts musical features, such as notes, swaras, note length, swara length, tone, tempo, Raga variation (temporal direction), Raga delineation, etc.

Speech-to-text module 214 is configured to convert audio data into text data. In an embodiment, the speech-to-text module 214 may intake an audio-related creative work that may contain words or speech as input. In an embodiment, the speech-to-text module 214 includes an acoustic model that has been trained on a labeled speech data. In an embodiment, the acoustic model may map audio-related features extracted by audio signal analyzer module 211 to phonetic units, such as individual sounds or phonemes, or larger units such as diphones or triphones. Further, the speech-to-text module 214 may further include a language model enabled to predict the most likely sequence of words in a given context. The language model may incorporate statistical information about word probabilities based on a corpus of text data, combined with linguistic context, grammar, and vocabulary. Further, the speech-to-text module 214 may further perform decoding and alignment operations to match the acoustic model's predicted phonetic units with the language model's predicted word sequences. Further, the speech-to-text module 214 may apply a decoding and/or alignment technique to the most likely sequence of words that corresponds to the input audio. Further, the speech-to-text module 214 may also perform a post-processing technique on the text data, based in part on language-specific grammar rules, statistical language models, and/or a machine learning algorithm, in order to correct errors and improve the accuracy of the output transcription. Further, the speech-to-text module 214 may output a written text representation of the words contained in the audio input. As a non-limiting example, if the input data includes a song, speech-to-text module 214 may extract the lyrics present in the song.

Text analysis module 215 is configured to extract text-related features from input text data corresponding to a creative work. In an embodiment, text analysis module 215 may receive textual data from speech-to-text module 214. In an embodiment, text analysis module 215 includes an ML model trained for performing text analysis to obtain quantitative and/or qualitative features related to the input text data. Text analysis module 215 may be configured to perform various text analysis related techniques for input text data, including but not limited to, text classification, text extraction, word frequency analysis, collocation, concordance, word sense disambiguation, and/or clustering. In an embodiment, text analysis module 214 performs text classification techniques including, but not limited to, sentiment analysis, topic modeling, language detection, and/or intent detection.

Emotion analyzer module 216 is configured to extract emotion-related features and/or sentiment-related features from a creative work. In an embodiment, emotion analyzer module 216 includes a machine learning model trained to extract emotion-related and/or sentiment-related features from a creative work. In an embodiment, emotion analyzer module 216 is configured to extract emotion-related and/or sentiment-related features from an audio-related creative work. In an embodiment, emotion analyzer module 216 is configured to extract emotion-related and/or sentiment-related features from a text-based creative work. As a non-limiting example, emotion analyzer module 216 may perform a sentiment analysis technique on an input text data related to the creative work. To continue on this nonlimiting example, suppose the text input data is lyrics to a song, the emotion analyzer 216 may determine whether lyrics contain words that signify that the song is, for example, positive, negative, neutral, happy, sad, angry, romantic, etc. As another nonlimiting example, for an audio-related creative work, emotion analyzer module 216 may perform a sentiment analysis technique on an input audio data related to the creative work. To continue on this nonlimiting example, suppose the audio input data is audio data of a song recording, emotion analyzer 216 may determine whether the song contains notes that signify that the song is happy, sad, angry, romantic, etc.

Style analyzer module 212 is configured to identify style associated with the creative work based on the features extracted by feature extraction module 210. Accordingly, a type of style may be identified based on a pattern of features extracted from the creative work. In an embodiment, style analyzer module 212 may include a machine learning (ML) model trained to classify the style of a particular creative work. The ML model may be trained on a combination of labeled data and unlabeled data. Labeled data may include a dataset of data samples representative of creative works, wherein each creative work may be labeled as belonging to a particular style. As a nonlimiting example, if the creative work is a piece of music, the piece of music may be labeled as western classical, hindustani classical, carnatic classical, rock, jazz, etc. The ML model learns the underlying patterns between labeled data samples corresponding to the same style to be able to classify input unlabeled data samples as belonging a particular style. To continue the previous non-limiting example, if the ML model is input a piece of music that is not labeled with a particular style, the ML model may classify unlabeled piece of music as belonging to a particular genre, such as western classical, hindustani classical, carnatic classical, rock, jazz, etc. Although the ML model has been described with reference to classifying a piece of music by genre, it is contemplated that the ML model may be trained to classify any creative work as belonging to and/or associated with any corresponding style, not limited to genre. As another nonlimiting example, if the creative work comprises a piece of writing, then a style associated with a piece of writing may include, but is not limited to, creative writing, business writing, legal writing, professional writing, narrative writing, descriptive writing, expository writing, persuasive writing, objective writing, subjective writing, speech writing, song writing, poetic writing, technical writing, etc.

It is contemplated that identifying the style of the creative work enables the authorship detection module 200 of FIG. 2A to identify a possible author of a creative work across a smaller domain. Accordingly, narrowing down the domain by a particular style may enable faster identification of an author for an unidentified creative work. Further, narrowing the search domain further saves computer resources, so that the authorship detection module 200 does not waste computer resources on searching for an author across a domain including all identified creative works. Prior to determining a type of style of the creative work, the creative work may have thousands or more possible authors. By determining the type of style of creative work, creative works may be organized into narrower categories compared to a grouping that contains all of the creative works.

Sophistication analyzer module 213 is configured to determine a sophistication based on the features extracted by feature extraction module 210. Accordingly, a type of sophistication may be identified based in part on a complexity of a pattern of features extracted from the creative work. In an embodiment, sophistication analyzer module 212 may include a machine learning (ML) model trained to classify a creative work by sophistication. The ML model may be trained on a combination labeled data and unlabeled data. Labeled data may include a dataset of data samples representative of creative works, wherein each creative work may be labeled as exhibiting a certain type of sophistication. The ML model learns the underlying patterns between labeled data samples corresponding to the same sophistication to be able to classify input unlabeled data samples as exhibiting a particular sophistication. It is contemplated that identifying the sophistication of a creative work enables the authorship detection module 200 of FIG. 2A to identify a possible author of a creative work across a smaller domain. Accordingly, narrowing down the domain by a particular sophistication may enable faster identification of an author for an unidentified creative work. Further, narrowing the search domain by sophistication may narrow the search domain even further than narrowing down the search by style alone, thereby further saving computer resources that might otherwise be wasted on identifying an author across a domain including non-relevant identified creative works.

Figure 2C:
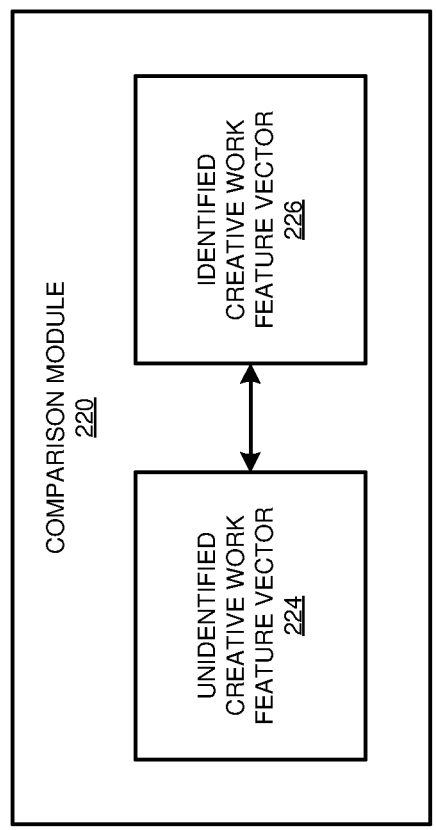
FIG. 2C depicts a block diagram of an example comparison module in accordance with illustrative embodiments.

With reference to FIG. 2C, this figure depicts a block diagram of an example comparison module 220. In the illustrated embodiment, the comparison module 220 includes the comparison module 220 of FIG. 2A. The comparison module 220 is configured to compare an unidentified creative work to an identified creative work. In an embodiment, the comparison module 220 compares an unidentified creative work feature vector 224 to an identified creative work feature vector 226. The features of feature vector 224 and feature vector 226 include features that have been extracted from an unidentified creative work and an identified creative work by the feature extraction module 210 of FIG. 2A-2B, respectively. In an embodiment, the comparison module 220 calculates the cosine similarity between unidentified creative work feature vector 224 to an identified creative work feature vector 226. It is contemplated that other vector similarity assessment techniques may also be employed in addition to, instead of, or in combination with cosine similarity, including but not limited to, Euclidean distance, triangle area similarity (TS), sector area similarity (SS), and/or any combination thereof. Further, although only one identified creative work feature vector 226 is shown in FIG. 2C, it is contemplated that a similarity metric may be calculated between an identified creative work feature vector 224 and any number of creative work feature vectors to construct a rank ordering of identified creative work feature vectors based on similarity of each to the unidentified creative work feature vector 224.

In an embodiment, comparison module 220 calculates a probability score for each of a plurality of identified creative works based in part on a similarity score previously calculated between each identified creative work and the unidentified creative work. In some such embodiments, comparison module 220 calculates a similarity score between the unidentified creative work and each of the one or more identified creative works, as described above. Further, the comparison module 220 transforms the similarity score between the unidentified creative work and each identified creative work into a probability score, wherein the probability score represents the likelihood that the unidentified creative work and an identified creative work belong to the same author. In some such embodiments, the process may include applying a transformation function to the similarity score to convert the similarity score into a probability score. Examples of a transformation function that may be utilized may include, but are not limited to, a linear transformation function, a sigmoid transformation function, an exponential transformation function, and/or any other suitable transformation function to convert the similarity score to a probability score.

As a nonlimiting example, suppose a linear transformation function is utilized to convert the similarity score to a probability score. In a case where a linear transformation function is utilized, a probability score between the unidentified creative work and each identified creative work may be calculated via the following exemplary equation: Probability Score=(Similarity Score-Minimum Similarity Score)/(Maximum Similarity Score-Minimum Similarity Score). Accordingly, Similarity Score corresponds to the similarity score between the unidentified creative work and a particular identified creative work, the Minimum Similarity Score corresponds to the minimum similarity score in a range of similarity scores calculated between the unidentified creative work and the identified creative works, and the Maximum Similarity Score corresponds to the maximum similarity in a range of similarity scores calculated between the unidentified creative work and the identified creative works. In accordance with the linear transformation function above, a Probability Score of 1 may represent a very high likelihood that the unidentified creative work and a particular identified creative work belong to the same author, while a Probability Score of 0 may represent a very low likelihood that the unidentified creative work and a particular identified creative belong to the same author. Although a linear transformation function is described above with respect to transforming the similarity score to a probability score, the use of this example is nonlimiting, and other transformation functions are considered to be within the scope of the present disclosure.

Figure 3:
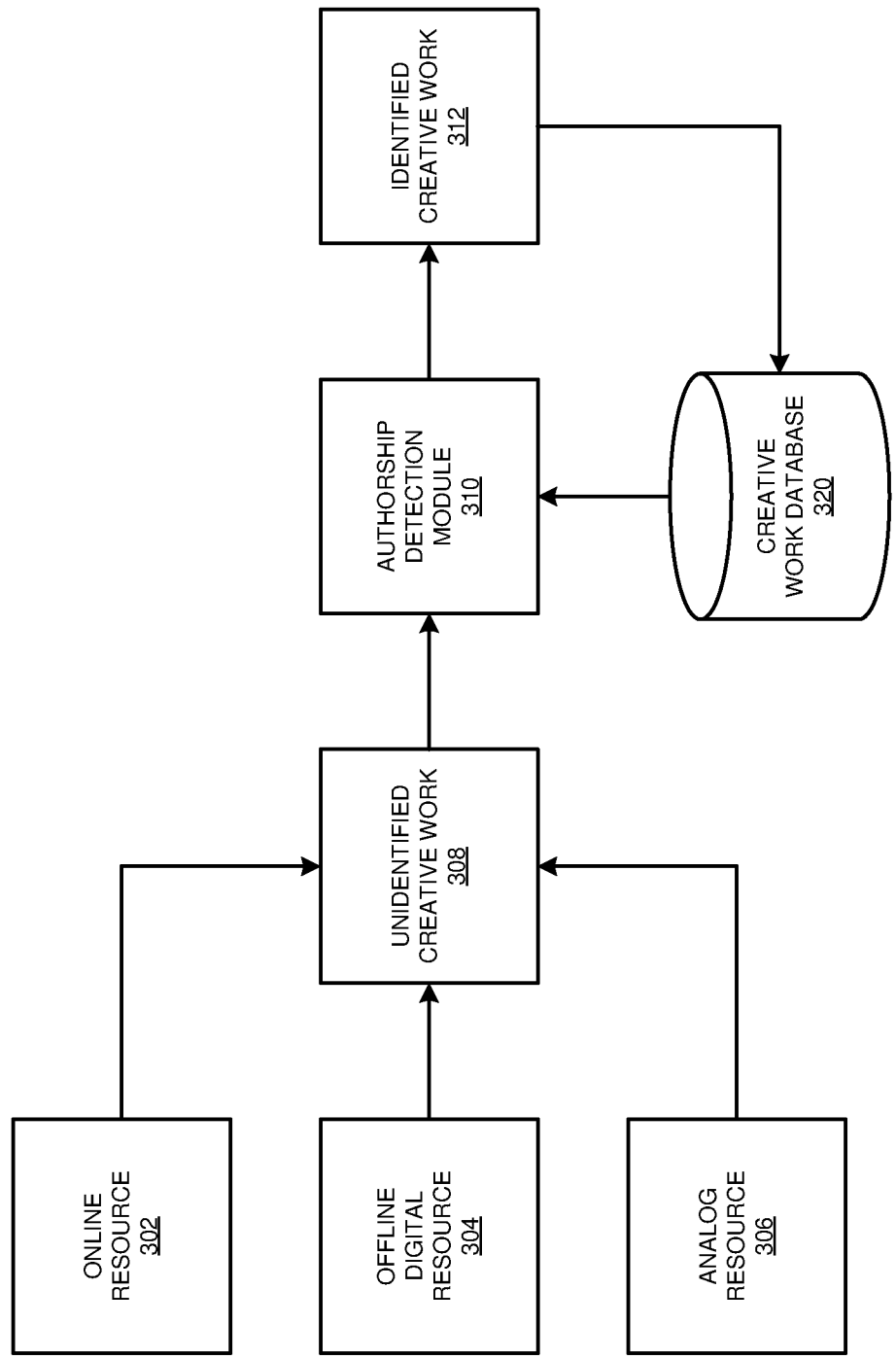
FIG. 3 depicts a block diagram of an abstracted model for an example process for identifying an author of a creative work in accordance with illustrative embodiments.

With reference to FIG. 3, this figure depicts a block diagram of an abstracted model for an example process for identifying an author of a creative work in accordance with illustrative embodiments. In the illustrated embodiment, the authorship detection module 310 is an example of the authorship detection module 200 of FIG. 2.

In the illustrated embodiment, the authorship detection module 310 receives input data corresponding to an unidentified creative work 308 and outputs an identified creative work 312. The unidentified creative work 308 may include a creative work received from an online resource 302, an offline digital resource 304, and/or an analog resource 306. An online resource 302 refers to web-enabled storage enabled for storing media corresponding to a creative work. Examples of an online resource may include but are not limited to, a website, online media sharing platform, network attached storage (NAS), cloud storage, etc. An offline digital resource 304 refers to a digital storage device for storing media corresponding to a creative work. Examples of an offline digital resource may include, but are not limited to, hard-disk drives (HDDs), solid state drives (SSDs), USB flash drives, memory cards, optical discs (e.g., CDs, DVDs, Blu-ray discs), etc. An analog resource 306 refers to an analog storage device for storing media corresponding to a creative work. Examples of an analog resource may include, but are not limited to, paper, photographic paper, negative, film, microfilm, audio tape, VHS tape, vinyl records, phonograph cylinders, etc. It is contemplated that a creative work stored on an analog storage device may be converted and stored on to a digital storage device via an analog-to-digital converter (ADC) to enable feature extraction from the creative work.

The authorship detection module 310 extracts one or more features of the unidentified creative work 308 and compares the extracted features of the unidentified creative work 308 to features of one or more identified creative works stored on creative work database 320 whose author or authors are known. Further, based on a similarity between the extracted features of the unidentified work and previously extracted features corresponding to creative works of known authors stored in the creative work database 320, an author of the unidentified work may be identified, as described in greater detail herein. Upon having identified the author(s) of the unidentified creative work 308, the now unidentified creative work 308 is transformed into a new identified creative work 312. The new identified creative work 312 may be transmitted to and stored on creative work database 320. In an embodiment, the new identified creative work 312 is stored on a digital file. In said embodiment, the metadata of the digital file may be altered to include the author of the creative work, which may authenticate the creative work as being a creative work of a particular author. In some embodiments, the creative work database 320 is a distributed database. In some embodiments, the creative work database is a blockchain database. It is contemplated that storing the identified creative work on a blockchain database creates an immutable record of the authorship assigned to the creative work, thereby providing objective authenticity to the creative work. Further, storing the identified creative work 312 on a blockchain database may prevent the authorship information associated with the creative work from becoming lost in the future.

In an embodiment, the authorship detection module 310 determines the style and/or sophistication of the unidentified creative work based on the features extracted from the unidentified creative work, as described in greater detail herein. In an embodiment, a machine learning model is utilized to determine the style and/or sophistication of the creative work. Further, in an embodiment, the creative work database 320 may be categorized by style and/or sophistication. In an embodiment, rather than comparing the unidentified creative work across every identified creative work stored in creative work database 320, the unidentified creative work may be compared to identified creative works that belong to the same style. Further, in an embodiment, rather than comparing the unidentified creative work across every identified creative work within the same style category, the unidentified creative work may be compared to identified creative works that exhibit the same type of sophistication as the unidentified creative work. It is contemplated that the process of comparing an unidentified creative work to an identified creative work within the same style and/or sophistication category provides a significant improvement to the underlying computer technology utilized to perform the process. Accordingly, performing a narrower search reduces the amount of computer resources utilized to identify the author of an unidentified creative work. Rather than wasting computer resources by searching across the entire creative work database 320, the process may limit searching to within a particular style and/or sophistication category of the database 320.

Figure 4:
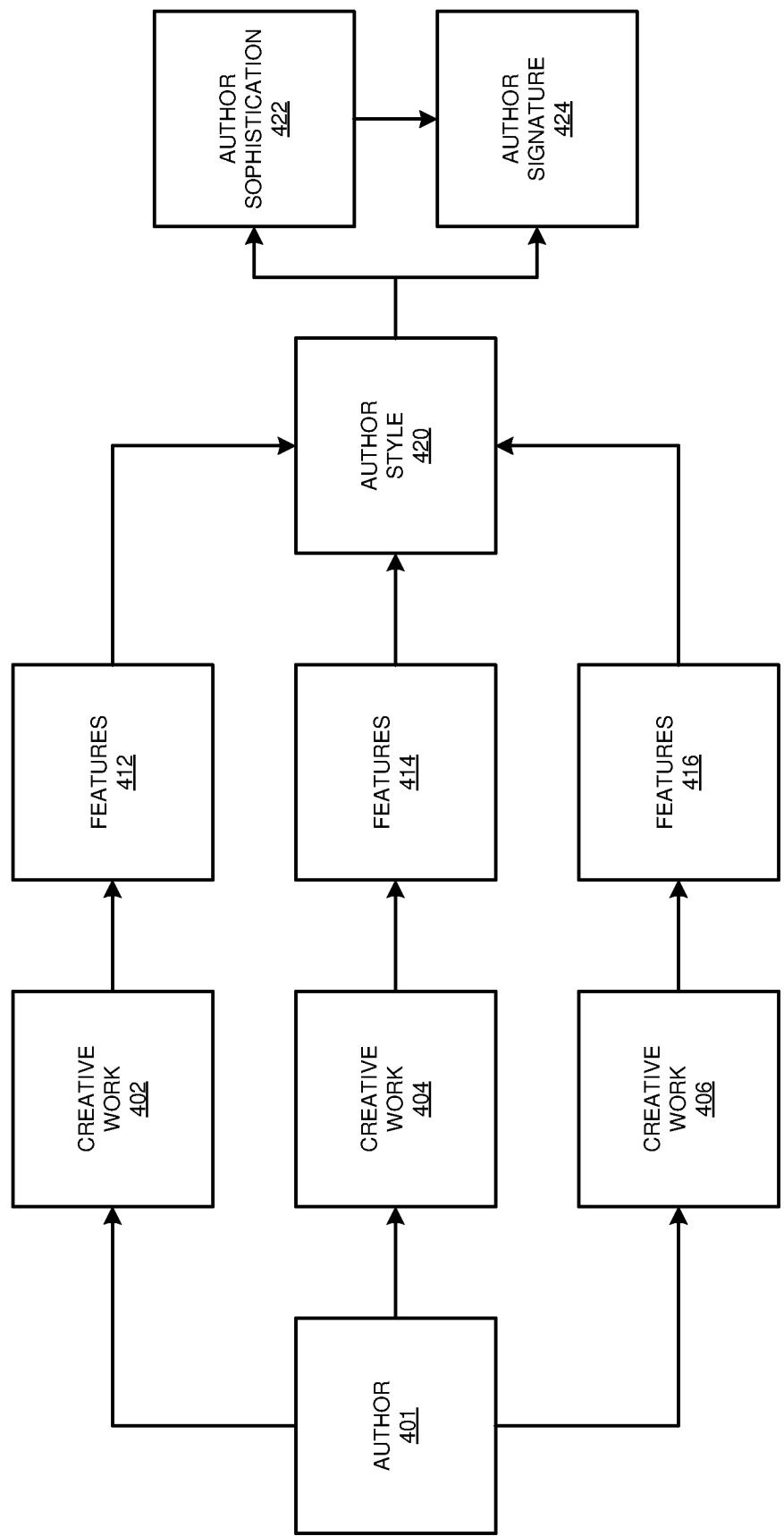
FIG. 4 depicts a block diagram of an abstracted model of a process for learning characteristics of an author of one or more creative works in accordance with illustrative embodiments.

With reference to FIG. 4, this figure depicts a block diagram of an abstracted model of a process for learning characteristics of an author of one or more creative works.

With continued reference to FIG. 4, an author 401 is shown as the creator and/or originator of a plurality of creative works, including creative work 402, creative work 404, and creative work 406. Further, the process extracts one or more features from each creative work of the plurality of creative works. In accordance with the illustrative embodiment, features 412 correspond to creative work 402, features 414 correspond to creative work 404, and features 416 correspond to creative work 406. The features of each creative work shown may include at least any of the features mentioned herein the present disclosure. Based on plurality of the features extracted from the plurality of creative works of the author 401, the process forms an author style 420. Accordingly, the author style 420 includes features representative of characteristics exhibited within the author's creative works. Further, the process forms an author sophistication 422 based in part on the features exhibited in the author style 420. In an embodiment, the author sophistication 422 includes a measure of complexity of one or more creative works associated with the author 401 based on the features extracted from the one or more creative works of the author 401. It is contemplated that author sophistication 422 may provide a low-level insight into the creative works of the author 401. Further, author signature 424 is shown as formed in part from author style 420 and author sophistication 422, and may likewise be formed in part directly from any features present within any creative works associated with the author. In an embodiment, author signature 424 is a unique identifier corresponding to the author 401.

Figure 5:
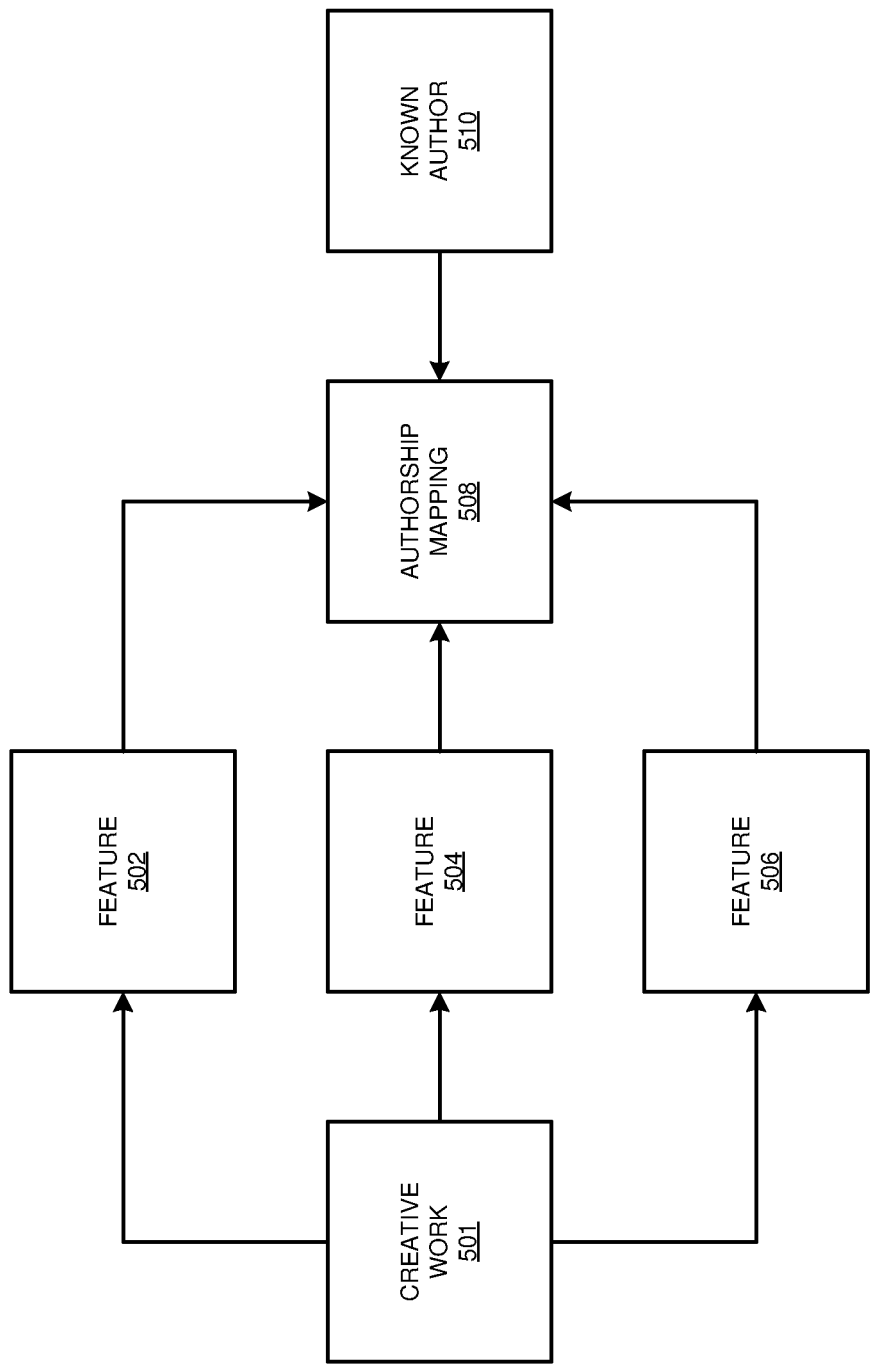
FIG. 5 depicts a block diagram of an abstracted model of a process for defining an authorship mapping in accordance with illustrative embodiments in accordance with illustrative embodiments.

With reference to FIG. 5, this figure depicts a block diagram of an abstracted model of a process for defining an authorship mapping in accordance with illustrative embodiments.

With continued reference to FIG. 5, a set of features, including feature 502, feature 504, and feature 506 are shown extracted from creative work 501. Further, an authorship mapping 508 is defined by defining the set of features with a known author 510. In an embodiment, the authorship mapping 508 enables comparison between a set of features of an unidentified creative work to a set of features of an identified creative work. Accordingly, if an unidentified creative work includes some or all of the features within a set of features corresponding to a known author, then the unidentified creative work may become identified as a creative work created and/or originated by a particular known author 510.

Illustrative embodiments depicted by FIGS. 2-5 provide a process for identifying an author of creative work that may be stored in multiple different types of data. In general, embodiments depicted in FIGS. 2-5 may utilize aspects of one or more machine learning models to extract features from one or more creative works, construct feature vectors corresponding to the one or more creative works based on the extracted features, compare the features vectors, and identify authorship of a creative work based on a comparison of the feature vectors and author or authors associated with the creative works. Feature extraction may include transforming raw audio waveforms, image pixel values, and/or text sequences into suitable numerical representations that capture important characteristics of one or more creative works. A machine learning model may utilize these features to learn patterns, make predictions, and/or perform other tasks. In some embodiments, the functionality described herein is distributed among a plurality of systems, which can include combinations of software and/or hardware-based systems, for example Application-Specific Integrated Circuits (ASICs), computer programs, or smart phone applications.

A particular embodiment provides a process for identifying an author from a creative work in the form of audio data. In some such embodiments, an embodiment includes identifying an author of an audio based creative work based in part on a waveform of an audio signal corresponding to the creative work. As a nonlimiting example, the process may identify an author of a piece of music. In accordance with the example, key notes and/or swaras as well as corresponding temporal relationships contained in a piece of music captured in an audio signal may be extracted obtained utilizing a fast Fourier transformation on the waveform of the audio signal. Accordingly, the process applies a Fast Fourier transformation (FFT) algorithm to obtain the frequency level(s) of the creative work. The FFT algorithm converts the waveform into a frequency-domain representation of the audio signal. In an embodiment, the audio signal corresponding to the creative work is pre-processed into a discrete-time domain prior to applying the FFT algorithm. In an embodiment, the FFT algorithm decomposes the time-domain signal into frequency components, and computes complex amplitudes (magnitude and phase) of different frequency bins. Accordingly, once the FFT algorithm has been applied, each complex amplitude may correspond to a specific frequency bin, wherein the number of frequency bins is equal to the length of the FFT. An embodiment further includes constructing a frequency-amplitude-time mapping by utilizing a windowing technique to map the frequency with respect to a specific time range.

As a nonlimiting example, the process may restrict comparison of creative works to creative works that fall within the same frequency as the unidentified creative work. It is contemplated that converting an audio-related creative work into a frequency-domain waveform may enable faster identification of a possible author that may be associated with creative works that fall into a particular range of frequencies. For example, suppose a set of all possible authors includes 1,000 singers, and suppose that an unidentified creative work is determined to exhibit a frequency between 100 Hz-120 Hz. In said scenario, it may be the case that only 10 out of the 1,000 singers sing between 100-120 Hz. Accordingly, a subset of 10 possible singers associated with a frequency of between 100-120 Hz may be formed, and the unidentified creative work may be compared to creative works associated with the subset of singers associated with a frequency between 100-120 Hz.

In an embodiment, the process further includes converting an audio waveform of an unidentified creative work into a first graph, and an audio waveform of an identified creative work into a second graph. Further, in said embodiment, the process may compare the first graph to the second graph to determine the similarity and/or dissimilarity between the unidentified creative work and the identified creative work. Further, comparing the first graph to the second graph may include superimposing the first graph and the second graph and marking points of similarity and/or dissimilarity between the first graph and the second graph.

Figure 6:
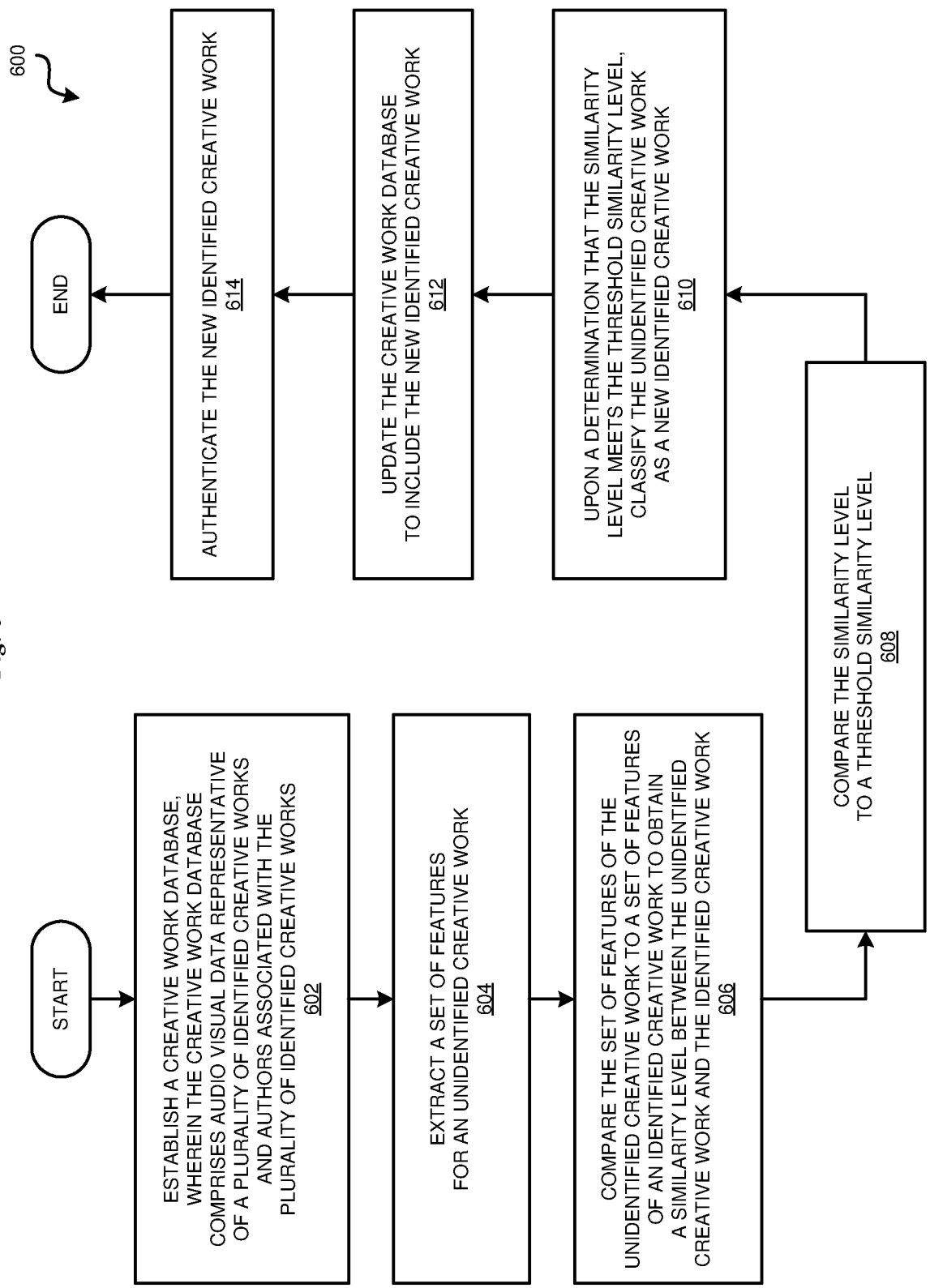
FIG. 6 depicts a flowchart of an example process for identifying an author of a creative work in accordance with illustrative embodiments.

With reference to FIG. 6, this figure depicts a flowchart of an example process 600 for identifying an author of a creative work in accordance with an illustrative embodiment. In a particular embodiment, the authorship detection module 200 of FIGS. 1 and 2A and/or authorship detection module 310 of FIG. 3 carries out the process 600.

In the illustrated embodiment, at block 602, the process establishes a creative work database based in part on data representative of a plurality of identified creative works and authors associated with the plurality of identified creative works. The data representative of a plurality of identified creatives works includes audio data, text data, and/or image data. The creative work database may receive data representative of the plurality of creative work from an online resource, an offline digital resource, an analog resource, and/or any combination thereof. In an embodiment, the creative work database may be categorized by style-type, sophistication-type, or both. In an embodiment, the database is a blockchain database.

At block 604, the process extracts a set of features for an unidentified creative work. The unidentified creative work may likewise be received from an online resource, an offline digital resource, an analog resource, and/or any combination thereof. In an embodiment, the set of features includes audio-related features, text-related features, image related features, style-related features, sophistication-related features, signature-related features, and/or any combination thereof. In an embodiment, the process further defines a style-type corresponding to the unidentified creative work based on an observed pattern of features within set of features extracted. In an embodiment, the process further defines a sophistication-type corresponding to the unidentified creative work based in part on the complexity of the observed pattern within the set of features extracted.

At block 606, the process compares the set of features of the unidentified creative work to a set of features of an identified creative work to obtain a similarity score between the unidentified creative work and the identified creative work. In an embodiment, the process includes utilizing cosine similarity to determine the similarity score between the unidentified creative work and the identified creative work. In some embodiments, the process further includes calculating a probability score based on the similarity score assigned to one or more identified creative works. Accordingly, in some such embodiments, the process includes transforming the similarity score between the unidentified creative work and each identified creative work of a plurality of identified creative works into a probability score, wherein the probability score represents the likelihood that the unidentified creative work and an identified creative work belong to the same author. In some such embodiments, the process may include applying a transformation function to the similarity score to convert the similarity score into a probability score. Examples of a transformation function that may be utilized may include, but are not limited to, a linear transformation function, a sigmoid transformation function, an exponential transformation function, and/or any other suitable transformation function to convert the similarity score to a probability score.

At block 608, the process compares the similarity score to a threshold similarity score. At block 610, upon a determination that the similarity score meets the threshold similarity score, the process identifies the author of the identified creative work as the author of the unidentified creative work, and classifies the unidentified creative work as a new identified creative work. In some embodiments, the process compares the unidentified creative work to a plurality of identified creative works. Further, some such embodiments include constructing a rank ordering of a plurality identified creative works based on the similarity of each identified creative work to the unidentified creative work, and identifying the author of the highest ranked identified creative work as the author of the unidentified creative work. Further, in some embodiments, the process includes constructing a rank ordering of a plurality identified creative works based on the probability score of each identified creative work, and identifying the author of the highest ranked identified creative work as the author of the unidentified creative work. In some embodiments, the process further includes calculating an SME validation score to be used in conjunction with the probability score to identify an author of an unidentified creative work. Accordingly, in some such embodiments, the SME validation score may be implemented in situations including, but not limited to, a situation where two or more similarity scores are sufficiently high, a situation where two or more probability scores are sufficiently high, a situation where two or more similarity scores are very close in value to each other, a situation where two or more probability scores are very close in value to each other, a situation where no similarity scores are sufficiently high, a situation where no probability scores are sufficiently high, as well as other situations.

At block 612, the process updates the creative work database to include the new identified creative work. At block 614, the process authenticates the new identified creative work. In an embodiment, the new identified creative work is stored in the form of a digital file, and the process authenticates the new identified creative work by inserting metadata into the digital file to reflect the author of the new identified creative work.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    training a neural network model on a creative work database, the creative work database comprising data representative of a plurality of identified creative works and authors associated with the plurality of identified creative works;
    further enabling the neural network model, by applying machine learning to the neural network model, with a functionality of identifying a feature within the plurality of identified creative works, the further training producing a trained machine learning model, the feature being at least one of an audio-related feature, a text-related feature, a visual-related feature, and an emotion-related feature;
    extracting, using the trained machine learning model, a first set of features from an unidentified creative work;
    identifying, using the trained machine learning model, a type of sophistication corresponding to the unidentified creative work, wherein the type of sophistication is based at least in part on a complexity corresponding to the first set of features extracted from the unidentified creative work, and wherein an identification of the type of sophistication narrows down a list of potential authors of the unidentified creative work;
    comparing, using the trained machine learning model and within the narrowed down list of potential authors, the first set of features corresponding to the unidentified creative work to a second set of features corresponding to an identified creative work to obtain a similarity score between the unidentified creative work and the identified creative work;
    comparing, using the trained machine learning model, the similarity score to a threshold similarity score to determine whether the similarity score meets the threshold similarity score;
    upon a determination, by the trained machine learning model, that the similarity score meets the threshold similarity score, identifying a particular author from the narrowed down list of potential authors to associate with the unidentified creative work and classifying the unidentified creative work as a new identified creative work;
    authenticating, using the trained machine learning model, the new identified creative work by associating a detail related to the particular author with the new identified creative work; and
    updating the creative work database and the trained machine learning model to include the new identified creative work and an authentication reflective of the particular author.

2. The computer-implemented method of claim 1, wherein identifying the particular author comprises comparing the first set of features corresponding to the unidentified creative work to a mapping of known authors and features associated with the known authors.

3. The computer-implemented method of claim 1, further comprising constructing a first feature vector based on the first set of features corresponding to the unidentified creative work and a second feature vector based on the second set of features corresponding to the identified creative work, wherein the similarity score between the unidentified creative work and the identified creative work is based on a similarity between the first feature vector and the second feature vector.

4. The computer-implemented method of claim 3, wherein the similarity score is calculated via a cosine similarity technique between the first feature vector and the second feature vector.

5. The computer-implemented method of claim 1, further comprising identifying a style corresponding to the unidentified creative work.

6. The computer-implemented method of claim 5, further comprising comparing the unidentified creative work to a subset of identified creative works comprising a same style as the style corresponding to the unidentified creative work.

7. The computer-implemented method of claim 1, further comprising comparing the unidentified creative work to a subset of identified creative works comprising a same sophistication as the sophistication corresponding to the unidentified creative work.

8. The computer-implemented method of claim 1, wherein the new identified creative work comprises a digital file, and authenticating the new identified creative work comprises writing metadata on the digital file to record the particular author associated with the new identified creative work.

9. The computer-implemented method of claim 1, further comprising comparing the unidentified creative work to a subset of identified creative works, calculating a similarity score for each identified creative work of the subset of identified creative works, and identifying the particular author based on a highest similarity score.

10. A computer program product comprising one or more computer readable storage media, and program instructions collectively stored on the one or more computer readable storage media, the program instructions executable by a processor to cause the processor to perform operations comprising:

training a neural network model on a creative work database, the creative work database comprising based in part on data representative of a plurality of identified creative works and authors associated with the plurality of identified creative works;

further enabling the neural network model, by applying machine learning to the neural network model, with a functionality of identifying a feature within the plurality of identified creative works, the further training producing a trained machine learning model, the feature being at least one of an audio-related feature, a text-related feature, a visual-related feature, and an emotion-related feature;

extracting, using the trained machine learning model, a first set of features from an unidentified creative work;

identifying, using the trained machine learning model, a type of sophistication corresponding to the unidentified creative work, wherein the type of sophistication is based at least in part on a complexity corresponding to the first set of features extracted from the unidentified creative work, and wherein an identification of the type of sophistication narrows down a list of potential authors of the unidentified creative work;

comparing, using the trained machine learning model and within the narrowed down list of potential authors, the first set of features corresponding to the unidentified creative work to a second set of features corresponding to an identified creative work to obtain a similarity score between the unidentified creative work and the identified creative work;

comparing, using the trained machine learning model, the similarity score to a threshold similarity score to determine whether the similarity score meets the threshold similarity score;

upon a determination, by the trained machine learning model, that the similarity score meets the threshold similarity score, identifying a particular author from the narrowed down list of potential authors to associate with the unidentified creative work and classifying the unidentified creative work as a new identified creative work;

authenticating, using the trained machine learning model, the new identified creative work by associating a detail related to the particular author with the new identified creative work; and updating the creative work database and the trained machine learning model to include the new identified creative work and an authentication reflective of the particular author.

11. The computer program product of claim 10, wherein the stored program instructions are stored in a computer readable storage device in a data processing system, and wherein the stored program instructions are transferred over a network from a remote data processing system.

12. The computer program product of claim 10, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

13. The computer program product of claim 10, wherein identifying the particular author comprises comparing the features of first set of features corresponding to the unidentified creative work to a mapping of known authors and features associated with the known authors.

14. The computer program product of claim 10 further comprising identifying a style corresponding to the unidentified creative work.

15. The computer program product of claim 14 further comprising comparing the unidentified creative work to a subset of identified creative works comprising a same style as the style corresponding to the unidentified creative work.

16. The computer program product of claim 10 further comprising comparing the unidentified creative work to a subset of identified creative works comprising a same sophistication as the sophistication corresponding to the unidentified creative work.

17. A computer system comprising a processor and one or more computer readable storage media, and program instructions collectively stored on the one or more computer readable storage media, the program instructions executable by the processor to cause the processor to perform operations comprising:

training a neural network model on a creative work database, the creative work database comprising based in part on data representative of a plurality of identified creative works and authors associated with the plurality of identified creative works;

further enabling the neural network model, by applying machine learning to the neural network model, with a functionality of identifying a feature within the plurality of identified creative works, the further training producing a trained machine learning model, the feature being at least one of an audio-related feature, a text-related feature, a visual-related feature, and an emotion-related feature;

extracting, using the trained machine learning model, a first set of features from an unidentified creative work;

identifying, using the trained machine learning model, a type of sophistication corresponding to the unidentified creative work, wherein the type of sophistication is based at least in part on a complexity corresponding to the first set of features extracted from the unidentified creative work, and wherein an identification of the type of sophistication narrows down a list of potential authors of the unidentified creative work;

comparing, using the trained machine learning model and within the narrowed down list of potential authors, the first set of features corresponding to the unidentified creative work to a second set of features corresponding to an identified creative work to obtain a similarity score between the unidentified creative work and the identified creative work;

comparing, using the trained machine learning model, the similarity score to a threshold similarity score to determine whether the similarity score meets the threshold similarity score;

upon a determination, by the trained machine learning model, that the similarity score meets the threshold similarity score, identifying a particular author from the narrowed down list of potential authors to associate with the unidentified creative work and classifying the unidentified creative work as a new identified creative work;

authenticating, using the trained machine learning model, the new identified creative work by associating a detail related to the particular author with the new identified creative work; and updating the creative work database and the trained machine learning model to include the new identified creative work and an authentication reflective of the particular author.

18. The computer system of claim 17, further comprising identifying a style corresponding to the unidentified creative work.

19. The computer system of claim 18, further comprising comparing the unidentified creative work to a subset of identified creative works comprising a same style as the style corresponding to the unidentified creative work.

20. The computer system of claim 17, further comprising comparing the unidentified creative work to a subset of identified creative works comprising a same sophistication as the sophistication corresponding to the unidentified creative work.

\* \* \* \* \*